United States Patent
Chen et al.

(12)

(10) Patent No.: US 11,091,583 B2
(45) Date of Patent: Aug. 17, 2021

(54) PREPARATION METHOD OF SHAPE MEMORY POLYURETHANE

(71) Applicant: SHENZHEN UNIVERSITY, Guangdong (CN)

(72) Inventors: Shaojun Chen, Guangdong (CN); Shuqin Fu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 162 days.

(21) Appl. No.: 16/452,517

(22) Filed: Jun. 25, 2019

(65) Prior Publication Data

US 2019/0315907 A1  Oct. 17, 2019

Related U.S. Application Data

(63) Continuation of application No. PCT/CN2017/091816, filed on Jul. 5, 2017.

(51) Int. Cl.
| | |
|---|---|
| *C08G 18/42* | (2006.01) |
| *C08G 18/10* | (2006.01) |
| *C08G 18/24* | (2006.01) |
| *C08G 18/32* | (2006.01) |
| *C08G 18/73* | (2006.01) |
| *C08G 63/08* | (2006.01) |
| *C08G 18/12* | (2006.01) |

(52) U.S. Cl.
CPC ......... *C08G 18/4286* (2013.01); *C08G 18/10* (2013.01); *C08G 18/12* (2013.01); *C08G 18/244* (2013.01); *C08G 18/3206* (2013.01); *C08G 18/4202* (2013.01); *C08G 18/4277* (2013.01); *C08G 18/73* (2013.01); *C08G 63/08* (2013.01)

(58) Field of Classification Search
CPC .... C08G 18/4286; C08G 18/10; C08G 18/12; C08G 18/244; C08G 18/3206; C08G 18/73; C08G 18/4202; C08G 18/4277; C08G 63/08
See application file for complete search history.

(56) References Cited

U.S. PATENT DOCUMENTS

| | | | |
|---|---|---|---|
| 8,349,299 B2* | 1/2013 | Hu | A61K 8/87 424/70.11 |
| 9,422,393 B2* | 8/2016 | Mather | C08G 18/771 |
| 10,329,376 B2* | 6/2019 | Chen | C08G 18/7671 |
| 2009/0093606 A1* | 4/2009 | Hu | C08G 18/4277 528/52 |

* cited by examiner

*Primary Examiner* — Rabon A Sergent

(57) ABSTRACT

The present disclosure provides a preparation method of a shape memory polyurethane, which comprising: reacting 1,3,5,7-tetrahydroxyadamantane, ε-caprolactone, a catalyst and a solvent for 20-50 hours under the conditions of inert gas and 70° C. to 130° C. to obtain adamantyl star poly(ε-caprolactone), wherein the mole ratio of the 1,3,5,7-tetrahydroxyadamantane to the ε-caprolactone is 1:(40-240); mixing the adamantyl star poly(ε-caprolactone) with long-chain diol and diisocyanate, adding the catalyst and the solvent, and reacting for 3-9 hours at 50-100° C. to obtain an isocyanate-terminated polyurethane prepolymer, wherein the mass ratio of the adamantyl star poly(ε-caprolactone) to the long-chain diol is 9:1-1:9; and adding a linking agent in the polyurethane prepolymer so that the linking agent reacts with isocyanate in the polyurethane prepolymer to obtain an adamantyl cross-linked shape memory polyurethane.

7 Claims, 3 Drawing Sheets

Adamantyl star poly(ε-caprolactone) Ad-PCL$_4$ (a)   (b)   (c)

PREPARATION METHOD OF SHAPE MEMORY POLYURETHANE

CROSS-REFERENCE TO RELATED APPLICATION

This application is a continuation of International Application No. PCT/CN2017/091816, filed on Jul. 5, 2017, the contents thereof are incorporated herein by reference in its entirety.

TECHNICAL FIELD

The disclosure relates to the technical field of preparation of polyurethane materials, and particularly relates to a preparation method of shape memory polyurethane.

BACKGROUND

The shape memory polymer is an intelligent macromolecular material capable of fixing a temporary shape and recovering to an initial shape under the action of external stimulus (such as heat, light, magnetism or chemistry). Further, perfection of structure design of SMPs and improvement of functional characteristics of SMPs are current development directions of SMPs, and also are current research hot spots of intelligent polymeric materials.

Thermally induced shape memory polyurethane refers to a shape memory polymer material which can be deformed under a certain temperature and maintain a deformed shape at room temperature or low temperature, and can be recovered to the initial shape when the temperature rises to a specific response temperature. Since the thermally induced shape memory polyurethane has the advantages of adjustable shape recovery temperature, light weight, good weather resistance, raw material availability, large deformation amount, good repeated deformation effect and the like, it is one of rapidly developed shape memory polymer materials. The thermally induced shape memory polyurethane has an extremely huge potential value in the aspects of textile industry, biomedicine, daily life and the like.

However, the exiting thermally induced shape memory polyurethane is low in shape retention rate and shape recovery rate and poor in shape memory effect, and cannot be widely applied.

SUMMARY

The present disclosure provides a preparation method of a shape memory polyurethane, aiming at solving the problems in the prior art that the thermally induced shape memory polyurethane is low in shape retention rate and shape recovery rate and poor in shape memory effect, and cannot be widely applied.

The disclosure provides a preparation method of a shape memory polyurethane, comprising:

reacting 1,3,5,7-tetrahydroxyadamantane, ε-caprolactone, a catalyst and a solvent for 20-50 hours under the conditions of inert gas and 70° C. to 130° C. to obtain adamantyl star poly(ε-caprolactone), wherein the mole ratio of the 1,3,5,7-tetrahydroxyadamantane to the ε-caprolactone is 1:(40-240);

homogenously mixing the adamantyl star poly(ε-caprolactone) with long-chain diol and diisocyanate, adding the catalyst and the solvent, and reacting for 3-9 hours at 50-100° C. to obtain an isocyanate-terminated polyurethane prepolymer, wherein the mass ratio of the adamantyl star poly(ε-caprolactone) to the long-chain diol is 9:1-1:9; and adding a linking agent in the polyurethane prepolymer so that the linking agent reacts with isocyanate in the polyurethane prepolymer to obtain an adamantyl cross-linked shape memory polyurethane.

According to the preparation method of the shape memory polyurethane provided by the present disclosure, the adamantyl star poly-ε-caprolactone is obtained through polymerization reaction of adamantane and ε-caprolactone. This substance is long in molecular chain and stable in structure, and diisocyanate and the linking agent are introduced in the process of polymerization to obtain a framework-shaped shape memory polyurethane which is stable in cross-linking structure. The shape memory polyurethane has a stable structure, an easily adjusted framework structure, a shape retention rate of ≥93%, a shape recovery rate of ≥88% and has a good shape memory effect, thereby enlarging an application range.

BRIEF DESCRIPTION OF THE DRAWINGS

In order to more clearly illustrate the technical solution in an embodiment of the disclosure or in the prior art, drawings required to be used in the description of the embodiment or the prior art will be simply described below, apparently, drawings in the description below are only some embodiments in the disclosure.

DESCRIPTION OF THE EMBODIMENTS

To make the purpose, the features and the benefits of the disclosure more apparent and understandable, a clear and complete description is provided to the technical solution in the embodiment of the disclosure, apparently, the described embodiments are only a part of embodiments of the disclosure but not all the embodiments. Based on the embodiments in the disclosure, other embodiments obtained by those skilled in the art without creative efforts fall in the protective scope of the disclosure.

The embodiments of the present disclosure provide a method for preparing a shape memory polyurethane, the method mainly comprising the following steps:

reacting 1,3,5,7-tetrahydroxyadamantane, ε-caprolactone, a catalyst and a solvent for 20~50 hours under the conditions of inert gas and 70-130° C. to obtain adamantyl star poly (ε-caprolactone), wherein the mole ratio of the 1,3,5,7-tetrahydroxyadamantane to ε-caprolactone is 1:(40-240);

uniformly mixing the adamantyl star poly(ε-caprolactone) with long-chain diol and diisocyanate, adding the catalyst and the solvent, and reacting for 3-9 hours at 50-100° C. to obtain an isocyanate-terminated polyurethane prepolymer, wherein the mass ratio of the adamantyl star poly(ε-caprolactone) to the long-chain diol is 9:1 to 1:9; and adding a linking agent into the polyurethane prepolymer so that the linking agent reacts with isocyanate in the polyurethane prepolymer to obtain an adamantyl cross-linked shape memory polyurethane.

In the preparation method of the shape memory polyurethane provided by the disclosure, the bond length of adamantane is close to that of a C-C bond of diamond, and adamantane is a cage-shaped rigid body with a symmetrical high-stability rigid structure. Adamantane is polymerized with ε-caprolactone to obtain adamantyl star poly-ε-caprolactone. This substance is long in molecular chain and stable in structure. Diisocyanate is introduced in the process of polymerization to obtain an isocyanate-terminated polyurethane prepolymer, the small-molecule linking agent is utilized to react with isocyanate in the prepolymer to obtain the framework-shaped shape memory polyurethane which is stable in cross-linking structure. In particular, the molecular weight of the shape memory polyurethane is 500-10000. The shape memory polyurethane has a stable structure, an easily adjusted framework structure, a shape retention rate of ≥93%, a shape recovery rate of ≥88% and has a good shape memory effect, thereby enlarging an application range.

Figure 1:
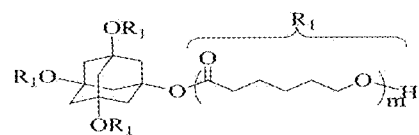
FIG. 1 is a molecular structure diagram of adamantyl star poly(ε-caprolactone) (Ad-PCL$_4$) provided by an embodiment of the present disclosure.
Figure 2:
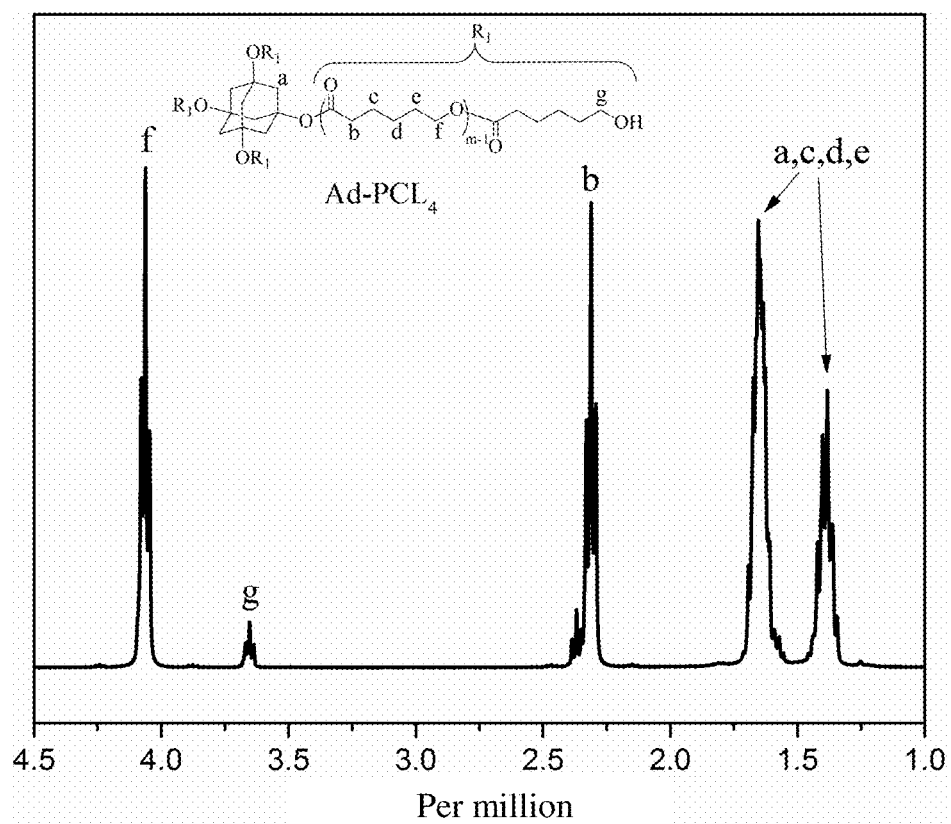
FIG. 2 is a nuclear magnetic hydrogen spectra of adamantyl star poly(ε-caprolactone) (Ad-PCL$_4$) provided by an embodiment of the disclosure.

Particularly, 1,3,5,7-tetrahydroxyadamantane reacts with ε-caprolactone, a catalyst and a solvent for 20-50 hours under the conditions of inert gas and 70-130° C. to obtain adamantyl star poly-ε-caprolactone, wherein the molecular structure of adamantyl star poly(ε-caprolactone) (Ad-PCL$_4$) is as shown in FIG. 1. A nuclear magnetic hydrogen spectrogram test is performed on adamantyl star poly(ε-caprolactone) to obtain a nuclear magnetic hydrogen spectrogram as shown in FIG. 2. It can be seen from characteristic peaks marked in the drawing that this substance is adamantyl star poly(ε-caprolactone). Preferably, 1,3,5,7-tetrahydroxyadamantane, ε-caprolactone, the catalyst and the solvent are reacted for 30-40 hours at a reaction temperature of 80-120° C., the mole ratio of the 1,3,5,7-tetrahydroxyadamantane to ε-caprolactone is 1:(180~240). More preferably, the mole ratio of 1,3,5,7-tetrahydroxyadamantane to ε-caprolactone is 1:240. The higher the content of ε-caprolactone is, the longer the molecular chain of adamantyl star poly(ε-caprolactone) is, and the higher the molecular weight is. The concentration of 1,3,5,7-tetrahydroxyadamantane is 10 wt %, the concentration of ε-caprolactone is 10 wt %, the amount of the catalyst is 0.1-0.2 wt %, the amount of the solvent is 60-70 wt %, and the amount of the linking agent is 5-15 wt %.

Particularly, adamantyl star poly(ε-caprolactone) is uniformly mixed with long-chain diol and diisocyanate, the catalyst and the solvent are added, and reaction is carried out for 3-9 hours at 50-100° C. to obtain an isocyanate-terminated polyurethane prepolymer. Preferably, the mass ratio of adamantyl star poly(ε-caprolactone) to long-chain diol is 9:1 to 1:9. Furthermore, addition of diol can increase the length of the molecular chain. In the reaction system, the molar ratio of the hydroxyl groups in both adamantyl star poly(ε-caprolactone) and long-chain diol to the isocyanate groups is 1:(1.2-2), preferably, the ratio is 1:1.5. In such a way, the isocyanate sufficiently reacts with hydroxyl groups in adamantyl star poly(ε-caprolactone) and long-chain diol to obtain an isocyanate-terminated polyurethane.

Particularly, the isocyanate is one selected from the group consisting of 2,4-toluene diisocyanate, 3,3'-dimethyl-4,4'-diisocyanate biphenyl, 4,4'-diphenylmethane diisocyanate, 1,5-naphthalene diisocyanate, 1,4-phenyldiisocyanate, 1,6-hexamethylene diisocyanate, trans-1,4-cyclohexane diisocyanate, 4,4'-dicyclohexylmethane diisocyanate and 3-isocyanate methylene-3,5,5-trimethylcyclohexyl isocyanate. The solvent is any one selected from the group consisting of toluene, N,N-dimethyl formamide, N,N-dimethyl acetamide, N-methyl pyrrolidone, dimethylsulfoxide and butyl acetate. The long-chain diol is any one selected from the group consisting of poly(ε-caprolactone) diol, poly(diethylene glycol adipate) diol, polyethylene adipate diol poly(1, 4-butanediol adipate) diol and polyglycol ether diol.

Figure 3:
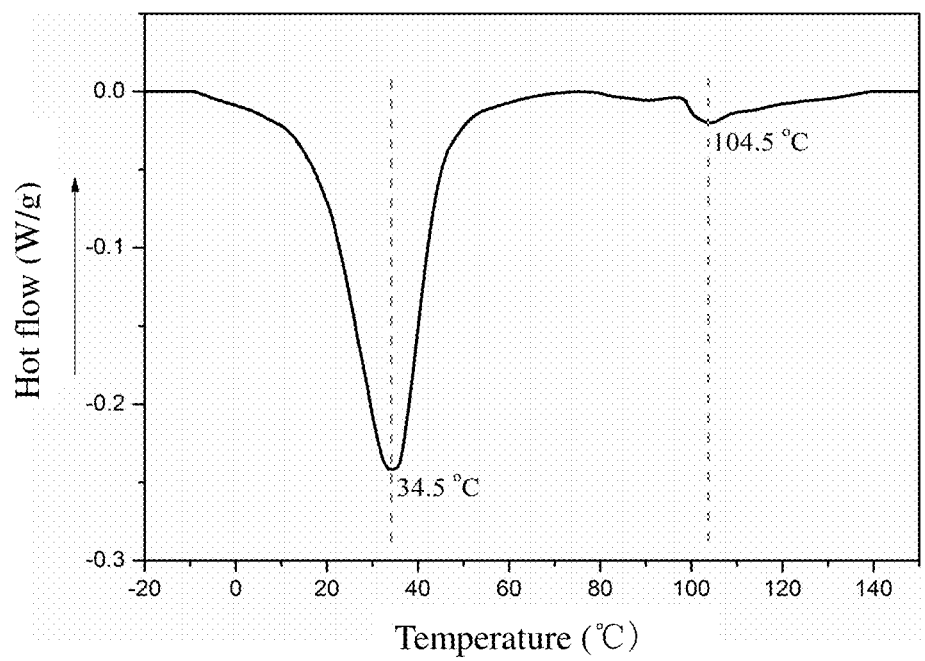
FIG. 3 is a differential scanning calorimetry diagram of a shape memory polyurethane provided by an embodiment of the disclosure.

Particularly, the linking agent is added into the polyurethane prepolymer so that the linking agent reacts with isocyanate in the polyurethane prepolymer to obtain adamantyl cross-linked shape memory polyurethane. In particular, the molecular weight of the obtained shape memory polyurethane (Ad-SMPU) is from 500 to 10000. A differential scanning calorimetry test is performed on the obtained shape memory polyurethane to obtain a differential scanning calorimetry graph as shown in FIG. 3. It can be seen from the drawing that the shape memory polyurethane has two phase change temperatures including a soft segment phase change temperature of 34.5° C. and a hard segment phase change temperature of 104.5° C., that is to say, the shape memory polyurethane is good in shape memory effect within a temperature range of 34.5-104.5° C., and this temperature range is applicable to an application range of an ordinary industry.

Figure 4:
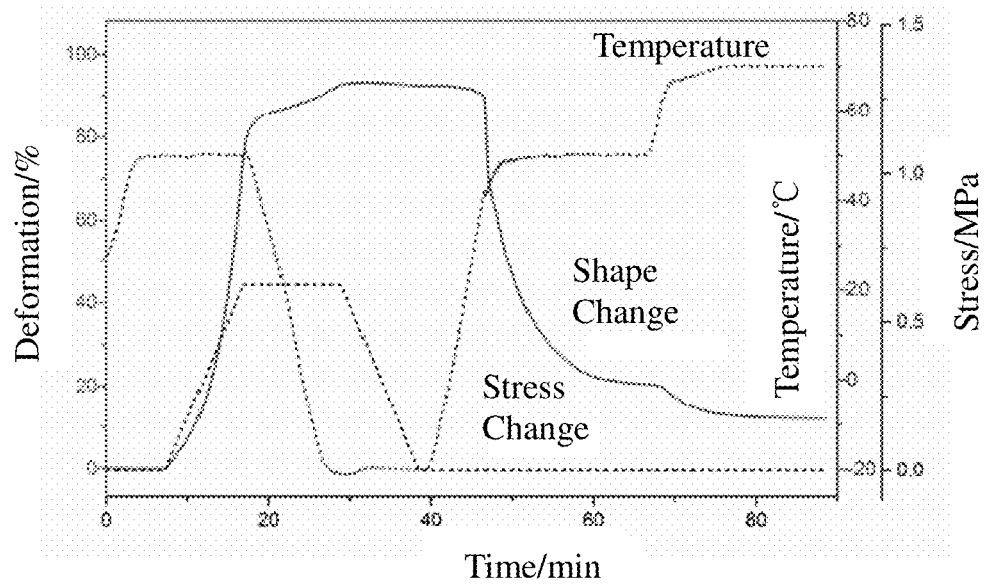
FIG. 4 is a test graph of testing a shape retention rate and a shape recovery rate of a shape memory polyurethane provided by an embodiment of the disclosure.
Figure 5:
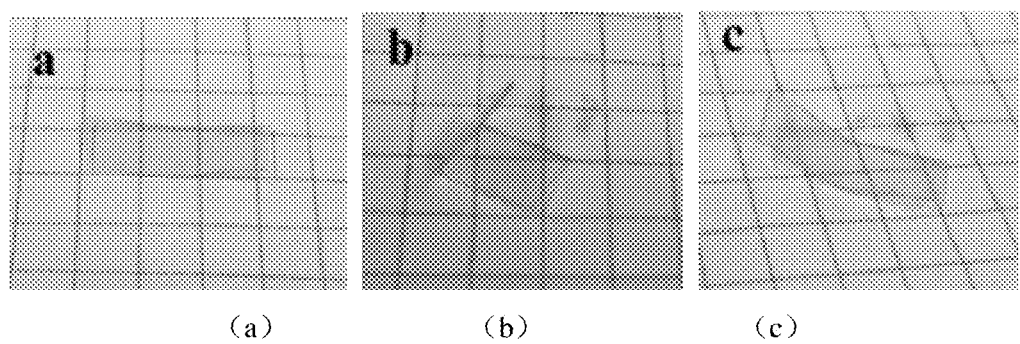
FIG. 5 is a diagram of change in shape recovery of a shape memory polyurethane corresponding to a test graph provided by an embodiment of the disclosure.

The shape retention rate and shape recovery rate of the shape memory polyurethane are rested, the result are shown in FIGS. 4 and 5, FIG. 4 and FIG. 5 respectively show dual shape memory property of the shape memory polyurethane. As shown in FIG. 4, the shape memory polyurethane Ad-SMPU is heated and preserved at 55° C. and a stress is applied; as shown in FIG. 5(b), Ad-SMPU is in a bending state, the temperature is reduced to −20° C., the stress is removed, and the temperature begins to rise, during that time, the shape of Ad-SMPU is well maintained. When the temperature rises to above 55° C., Ad-SMPU is gradually recovered from the bending state, the temperature continues to rise, and the recovery rate of Ad-SMPU is increased. It can be seen that the Ad-SMPU has good shape retention rate and shape recovery rate. In addition, due to the stable structure of adamantane, introduction of adamantane into the shape memory polyurethane can improve the thermal stability and mechanical property of the shape memory polyurethane.

Particularly, the catalyst is any one selected from the group consisting of stannous isooctanate and dibutyltin dilaurate. The linking agent is any one selected from the group consisting of 1,2-ethylene glycol, 1,3-propanediol, 1,4-butanediol, N-methyl-1,4-diol, 1,5-pentanediol, 1,6-hexanediol, 1,8-octanediol, 1,9-nonanediol, 1,10-decanediol, 1,4-cyclohexyl dimethanol, diethylene glycol, 1,4-cyclohexanediol, 1,6-hexanediol, 1,2-ethylenediamine, 1,3-propane diamine, 1,4-butanediamine, 1,6-hexamethylenediamine and 1,3-bi(tetramethyl disiloxane).

Example 1

1,3,5,7-tetrahydroxyadamantane, ε-caprolactone, a catalyst and a solvent were added into a reaction flask under the protection of inert gas, wherein the catalyst was stannous isooctanate, and the solvent was toluene; after oxygen and water were removed via three circulations of freezing, evacuation and aeration, the reaction flask was put in an oil bath pot and heated to 90° C. for 24 hours, the solvent was removed by rotary evaporation to obtain adamantyl star poly(ε-caprolactone). In this reaction, the molar ratio of 1,3,5,7-tetrahydroxyadamantane to ε-caprolactone was 1:60, the amount of stannous isooctanate was 0.1 wt %, and the amount of the solvent was 70 wt %.

The obtained adamantyl star poly(ε-caprolactone) was added into a mixture of 1,6-hexamethylene diisocyanate, poly(ε-caprolactone) diol (with molecular weight of 5000), a catalyst of stannous isooctanate and a reaction solvent of N,N-dimethyl formamide, stirred to mix well and then reacted at 80° C. to obtain a prepolymer. Then, 1,4-butanediol linked prepolymer was added, and the cross-linked adamantyl shape memory polyurethane was obtained by drying; the obtained cross-linked polyurethane was dried for 12 hours under the temperature of 90° C. to obtain a cross-linked adamantyl shape memory polyurethane.

Example 2

1,3,5,7-tetrahydroxyadamantane, ε-caprolactone, a catalyst and a solvent were added into a reaction flask under the protection of inert gas, wherein the catalyst was stannous isooctanate, and the solvent was toluene; after oxygen and water were removed via three circulations of freezing, evacuation and aeration, the reaction flask was put in an oil bath pot and heated to 90° C. for 24 hours, the solvent was removed by rotary evaporation to obtain adamantyl star poly(ε-caprolactone), wherein the molar ratio of 1,3,5,7-tetrahydroxyadamantane to ε-caprolactone was 1:100, the amount of stannous isooctanate was 0.1 wt %, and the amount of the solvent was 70 wt %.

The obtained adamantyl star poly(ε-caprolactone) was added into a mixture of 1,6-hexamethylene diisocyanate, poly(ε-caprolactone) diol (with molecular weight of 5000), a catalyst of stannous isooctanate and a reaction solvent of N,N-dimethyl formamide, uniformly stirred to mix well and then react at 80° C. to obtain a prepolymer. Then, 1,4-butanediol linked prepolymer was added, and a cross-linked adamantyl shape memory polyurethane was obtained by drying; the obtained cross-linked polyurethane was dried for 12 hours at 90° C. to obtain a cross-linked adamantyl shape memory polyurethane.

Example 3

1,3,5,7-tetrahydroxyadamantane, ε-caprolactone, a catalyst and a solvent were added into a reaction flask under the protection of inert gas, wherein the catalyst was stannous isooctanate, and the solvent was toluene; after oxygen and water were removed via three circulations of freezing, evacuation and aeration, the reaction flask was put in an oil bath pot and heated to 90° C. for 24 hours, the solvent was removed by rotary evaporation to obtain adamantyl star poly(ε-caprolactone), wherein the molar ratio of 1,3,5,7-tetrahydroxyadamantane to ε-caprolactone was 1:140, the amount of stannous isooctanate was 0.1 wt %, and the amount of the solvent was 70 wt %.

The obtained adamantyl star poly(ε-caprolactone) was added into a mixture of 1,6-hexamethylene diisocyanate, poly(ε-caprolactone) diol (with molecular weight of 5000), a catalyst of stannous isooctanate and a reaction solvent of N,N-dimethylformamide, uniformly stirred to mix well and then react at 80° C. to obtain a prepolymer. Then, 1,4-butanediol linked prepolymer was added, and a cross-linked adamantyl shape memory polyurethane was obtained by drying; the obtained cross-linked polyurethane was dried for 12 hours at 90° C. to obtain a cross-linked adamantyl shape memory polyurethane.

Example 4

1,3,5,7-tetrahydroxyadamantane, ε-caprolactone, a catalyst and a solvent were added into a reaction flask under the protection of inert gas, wherein the catalyst was stannous isooctanate, and the solvent was toluene; after oxygen and water were removed via three circulations of freezing, evacuation and aeration, the reaction flask was put in an oil bath pot and heated to 90° C. for 24 hours, the solvent was removed by rotary evaporation to obtain adamantyl star poly(ε-caprolactone), wherein the molar ratio of 1,3,5,7-tetrahydroxyadamantane to ε-caprolactone was 1:190, the amount of stannous isooctanate was 0.1 wt %, and the amount of the solvent was 70 wt %.

The obtained adamantyl star poly(ε-caprolactone) was added into a mixture of 1,6-hexamethylene diisocyanate, poly(ε-caprolactone) diol (with molecular weight of 5000), a catalyst of stannous isooctanate and a reaction solvent of N,N-dimethylformamide, uniformly stirred to mix well and then react at 80° C. to obtain a prepolymer. Then, 1,4-butanediol linked prepolymer was added, and a cross-linked adamantyl shape memory polyurethane was obtained by drying; the obtained cross-linked polyurethane was dried for 12 hours at 90° C. to obtain a cross-linked adamantyl shape memory polyurethane.

Example 5

1,3,5,7-tetrahydroxyadamantane, ε-caprolactone, a catalyst and a solvent were added into a reaction flask under the protection of inert gas, wherein the catalyst was stannous isooctanate, and the solvent was toluene; after oxygen and water were removed via three circulations of freezing, evacuation and aeration, the reaction flask was put in an oil bath pot and heated to 90° C. for 24 hours, the solvent was removed by rotary evaporation to obtain adamantyl star poly(ε-caprolactone), wherein the molar ratio of 1,3,5,7-tetrahydroxyadamantane to ε-caprolactone was 1:240, the amount of stannous isooctanate was 0.1 wt %, the amount of the solvent was 70 wt %.

The obtained adamantyl star poly(ε-caprolactone) was added into a mixture of 1,6-hexamethylene diisocyanate, poly(ε-caprolactone) diol (with molecular weight of 5000), a catalyst stannous isooctanate and a reaction solvent N,N-dimethylformamide, uniformly stirred to mix well and then react at 80° C. to obtain a prepolymer. Then, 1,4-butanediol linked prepolymer was added, and a cross-linked adamantyl shape memory polyurethane was obtained by drying; the obtained cross-linked polyurethane was dried for 12 hours at 90° C. to obtain a cross-linked adamantyl shape memory polyurethane.

The shape memory polyurethane obtained from the above 5 Examples is analyzed under a dynamic mechanical analysis with tension mode. The shape memory polyurethane obtained from Example 1 has a shape retention rate of 93% and a shape recovery rate of 88%, the shape memory polyurethane obtained from Example 2 has a shape retention rate of 93.8% and a shape recovery rate of 90%, the shape memory polyurethane obtained from Example 3 has a shape retention rate of 95% and a shape recovery rate of 91%, the shape memory polyurethane obtained from Example 4 has a shape retention rate of 97% and a shape recovery rate of 92%, and the shape memory polyurethane obtained from Example 5 has a shape retention rate of 98% and a shape recovery rate of 95%. It can be seen from the above Examples that the smaller the molar ratio of 1,3,5,7-tetrahydroxyadamantane to ε-caprolactone is, the higher the shape retention rate and the shape recovery rate are.

The above descriptions are only preferred examples in the disclosure, but are not intended to limit the disclosure. Any modifications, equivalent substitutions and improvements made within the spirit and principle of the disclosure are all included within the protection scope of the disclosure.

The invention claimed is:

1. A method for preparing a shape memory polyurethane comprising:

reacting 1,3,5,7-tetrahydroxyadamantane, ε-caprolactone, a first catalyst and a first solvent for 20-50 hours under the conditions of inert gas and a temperature of 70° C. to 130° C. to obtain adamantyl star poly(ε-caprolactone), wherein the mole ratio of the 1,3,5,7-tetrahydroxyadamantane to the ε-caprolactone is 1:40-1:240;

mixing the adamantyl star poly(ε-caprolactone) with long-chain diol and diisocyanate, adding a second catalyst and a second solvent, and reacting for 3-9 hours at 50-100° C. to obtain a solution of isocyanate-terminated polyurethane prepolymer, wherein the mass ratio of the adamantyl star poly(ε-caprolactone) to the long-chain diol is 9:1-1:9; and adding a linking agent in the solution of isocyanate-terminated polyurethane prepolymer so that the linking agent reacts with isocyanate in the polyurethane prepolymer to obtain an adamantyl cross-linked shape memory polyurethane, wherein the long-chain diol is one or more selected from the group consisting of poly(ε-caprolactone) diol, poly (diethylene glycol adipate) diol, polyethylene adipate diol, poly(1,4-butanediol adipate) diol and polyglycol ether diol;

the first catalyst is the same as the second catalyst, and the first solvent is the same as the second solvent.

2. The method of claim 1, wherein the mole ratio of the 1,3,5,7-tetrahydroxyadamantane to the ε-caprolactone is 1:180-1:240.

3. The method of claim 1, wherein the mass ratio of the adamantyl star poly(ε-caprolactone) to the long-chain diol is 9:1.

4. The method of claim 1, wherein the isocyanate is one selected from the group consisting of 2,4-toluene diisocyanate, 3,3'-dimethyl-4,4'-diisocyanate biphenyl, 4,4'-diphenylmethane diisocyanate, 1,5-naphthalene diisocyanate, 1,4-phenyldiisocyanate, 1,6-hexamethylene diisocyanate, trans-1,4-cyclohexane diisocyanate, 4,4'-dicyclohexylmethane diisocyanate and 3-isocyanate methylene-3,5,5-trimethylcyclohexyl isocyanate.

5. The method of claim 1, wherein the solvent is one or more selected from the group consisting of toluene, N,N-dimethyl formamide, N,N-dimethyl acetamide, N-methyl pyrrolidone, dimethylsulfoxide and butyl acetate.

6. The method of claim 1, wherein the linking agent is one or more selected from the group consisting of 1, 2-ethylene glycol, 1, 3-propanediol, 1,4-butanediol, 1,5-pentanediol, 1,6-hexanediol, 1,8-octanediol, 1,9-nonanediol, 1,10-decanediol, 1,4-cyclohexyl dimethanol, diethylene glycol, 1,4-cyclohexanediol, 1,6-hexanediol, 1, 2-ethylenediamine, 1,3-propane diamine, 1,4-butanediamine, and 1,6-hexamethylenediamine.

7. The method of claim 1, wherein the catalyst is stannous isooctanate and/or dibutyltin dilaurate.

* * * * *